United States Patent [19]
Wolf et al.

[11] 3,838,236
[45] Sept. 24, 1974

[54] ACTUATING MEANS FOR WARNING DEVICES

[75] Inventors: Walter A. Wolf; Wallace A. Gebhardt; Prentice R. Corn, all of Logansport, Ind.

[73] Assignee: Switches Incorporated, Logansport, Ind.

[22] Filed: May 23, 1973

[21] Appl. No.: 363,084

[52] U.S. Cl. ............................ 200/61.56, 200/61.57
[51] Int. Cl. ............................................ H01h 9/00
[58] Field of Search ............. 200/5 A, 61.54–61.57, 200/85 R, 85 A, 86 R, 86 A

[56] References Cited
UNITED STATES PATENTS

| | | | |
|---|---|---|---|
| 3,600,528 | 8/1971 | Leposavic | 200/5 A |
| 3,670,120 | 6/1972 | Corn et al. | 200/61.55 |
| 3,697,711 | 10/1972 | Tetrick | 200/5 A X |
| 3,720,938 | 3/1973 | Leposavic | 200/5 A X |
| 3,742,157 | 6/1973 | Leposavic | 200/5 A |

*Primary Examiner*—James R. Scott
*Attorney, Agent, or Firm*—Dressler, Goldsmith, Clement & Gordon, Ltd.

[57] ABSTRACT

The invention disclosed herein relates to an actuating means for a warning device such as a horn for an automobile. The actuating means includes an actuator that is supported at opposite sides on a base and overlying an elongated recess which supports a switch consisting of first and second elongated strips that are electrically insulated from each other by a resilient nonconductive member. The actuator has a plurality of longitudinally spaced projections extending towards the switch and slits dividing the actuator into a plurality of flaps so that application of a force to any point on the flaps will cause deflection of the actuator to produce engagement between the elongated strips.

9 Claims, 4 Drawing Figures

ACTUATING MEANS FOR WARNING DEVICES

BACKGROUND OF THE INVENTION

The present invention relates generally to elongated switches and more particularly to an improved actuating mechanism for such switches.

With the recent emphasis on safety and the requirement for resilient padding in the areas surrounding the operator's compartment of the vehicle, manufacturers have tended to eliminate the conventional type of horn actuating mechanism that is located at the center of the steering wheel and overlies the upper end of the steering column. One type of actuating mechanism that has been used as a replacement for the circular horn button incorporates elongated switches that consist of first and second elongated metal strips which are normally held in spaced relation to each other and are flexed into engagement with each other by the application of a force to one of the strips. To eliminate any protrusions extending from the steering wheel, the actuating mechanism for the strip switches is in the form of an inherently resilient cover having a substantially flush surface and some means cooperating with one of the strips of the switch so that deformation of the cover will actuate the switch.

In one such installation, the elongated strips are located in arms that extend from the center steering column for the vehicle and these arms may be a connection between the steering column and the steering rim or alternatively may be used as the steering element. Usually, these arms have a substantial width, which means that the resilient covering is also substantially wider than the narrow elongated switches. In this type of installation, difficulties have been encountered in insuring that the switch is actuated when force is applied to any portion of the resilient cover.

SUMMARY OF THE INVENTION

The actuating means for a warning device, such as a horn, includes an elongated switch consisting of first and second elongated strips that are electrically insulated from each other adjacent opposite edges and in which the switch is carried by a support, such as a steering mechanism for a vehicle, with a resilient cover overlying the support. The actuating means includes an actuator that is located between the resilient cover and the rigid support and the actuator is designed so that an application of force at any point between opposite sides of the resilient cover will produce contact between the elongated metal strips.

The actuator has opposite sides that are supported on ledges defined in the support or base of the steering mechanism and the intermediate portion of the actuator has dimples that are aligned with the elongated switch. Also, the actuator has a plurality of slits at selected locations so that the actuator can readily be flexed between the opposite supported sides when force is applied to any portion of the actuator.

In the specific embodiment, the slits divide the actuator into a plurality of flaps and each flap is integrally joined along one edge to the remainder of the actuator.

BRIEF DESCRIPTION OF THE SEVERAL VIEWS OF DRAWINGS

DETAILED DESCRIPTION

Figure 1:
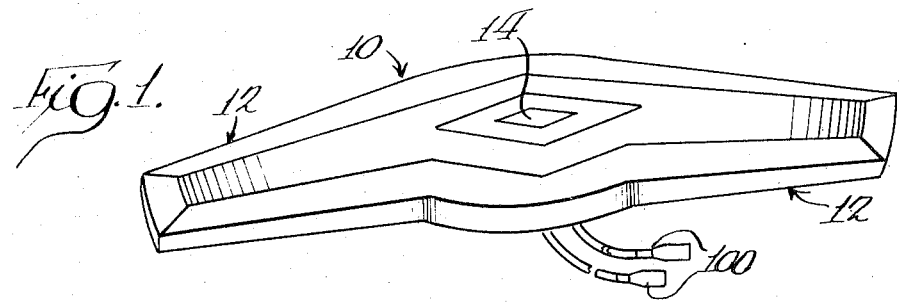
FIG. 1 is a perspective view of a steering mechanism having the present invention incorporated therein.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

Referring to the drawings, there is shown actuating means 10 for a warning device, such as the horn of a vehicle. In FIG. 1, the actuating means has been illustrated as the steering mechanism for a vehicle. The illustrated steering mechanism consists of two arms 12 that extend in opposite directions from a central portion 14 which is connected to a steering column (not shown). Actuating means or steering mechanism 10 consists of a rigid support 16, switch 18, actuator 20 and resilient cover 22. While the steering mechanism has been illustrated as consisting of two arms, the arms may have a steering rim connected at the periphery thereof, if desired.

The rigid support or base 16 has a bottom wall 24 and a vertical side wall 26, which has an outwardly directed flange 28, for a purpose that will be described later. The bottom wall 24 and side wall 26 cooperate to define a recess 30 and the bottom wall has a pair of transversely spaced L-shaped members or brackets 32 that cooperate to define a slot within the recess with switch 18 being supported in the slot, as shown in FIG. 3.

Switch 18 consists of a resilient outer tubular casing 36 that defines an elongated substantially rectangular passage 38 with recesses 40 in each corner of the rectangular passage 38. First and second elongated, resilient metal strips 42 and 44 are normally maintained in spaced relation within the passage 36 by having their outer edges received in the respective recesses 40, as shown in FIG. 3. To increase the sensitivity of the switch and produce point contact between the two strips, first strip 42 has a plurality of longitudinally spaced protrusions 46 that are located substantially along the center line between opposite lateral edges thereof. These protrusions may be formed by deforming the strip to produce a plurality of longitudinally spaced dimples. The second strip 44 may have a longitudinally extending bead 48 aligned with the protrusions 46 to further reduce the contact area between the strips.

The respective protrusions or dimples allow the switch to be actuated when localized pressure is applied to a restricted area of the switch contact strip. The height of protrusions can readily be varied during manufacture to vary the sensitivity of the switch and the protrusions will produce limited point contact between the strips resulting in higher contact pressure in the contact area. The advantages of this arrangement are set forth in U.S. Pat. No. 3,485,974, assigned to the assignee of this invention.

Figure 3:
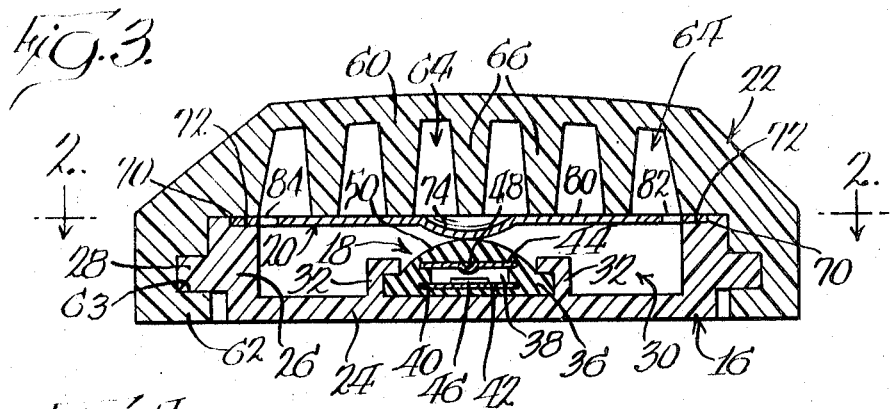
FIG. 3 is a vertical section, as viewed along line 3—3 of FIG. 2.
Figure 4:
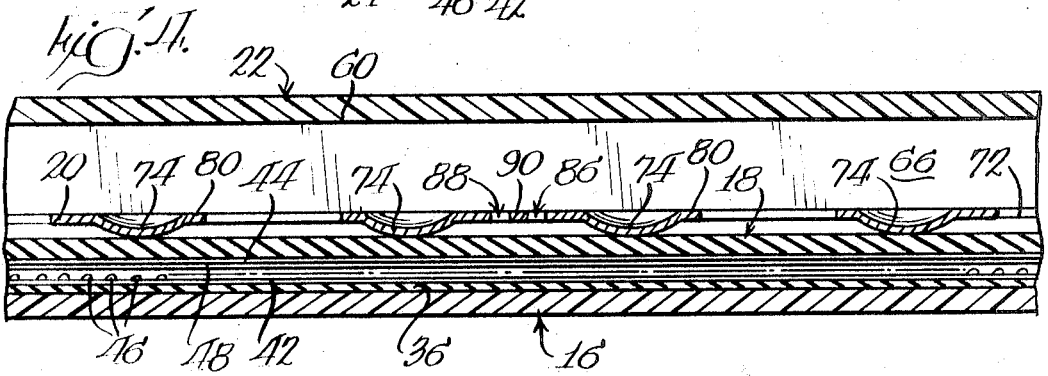
FIG. 4 is a vertical section as viewed along line 4—4 of FIG. 2.

As shown in FIG. 3, the upper surface 50 of the outer casing or resilient non-conductive member 36 has a convex cross-sectional configuration so that the center portion of the surface is located at the uppermost point of the outer casing.

Figure 2:
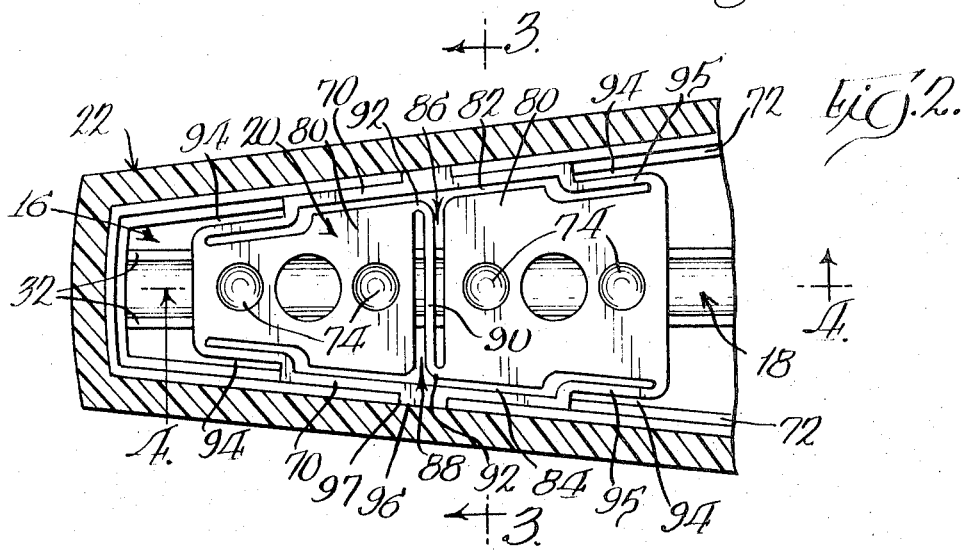
FIG. 2 is a horizontal section, as viewed generally along line 2—2 of FIG. 3.

An inspection of FIGS. 2 and 3 shows that the width of the base or support for the switch, as well as the recess 30, is substantially greater than the width of the switch 18. This structure makes it difficult to actuate the switch when force is applied to any portion of the cover for the steering mechanism. Such an arrangement is extremely important in providing a satisfactory horn operating mechanism, which many times must be actuated without giving careful attention to the exact location where the force must be applied.

To overcome this problem, the cover 22 and actuator 20 are constructed and cooperate with each other so that an actuating force applied at any location on the upper surface of the cover will actuate the switch.

Cover 22 includes a top wall 60 and a peripheral depending side wall 62 extending from the top wall with a recess 63 in the side wall of the cover that receives the flange 28 of the base or support 16 to hold the cover and base in an assembled relation. To increase the resiliency of the cover structure, top wall 60 has a plurality of elongated recesses 64 that produce a plurality of longitudinally extending ribs 66 depending from the top portion of wall 60. This will allow the cover to be deflected in a localized area when local pressure is applied to any portion of the resilient cover.

The details of actuator 20 are shown most clearly in FIG. 2 and include an elongated substantially flat member, preferably formed of spring steel. The substantially rectangular actuator or member 20 has opposite sides 70 that are supported on a peripheral ledge 72, which is defined on the upper inside edge of vertical wall 26. The transverse dimensions between the vertical wall of the ledge 72 and the outer edges of the sides 70 of actuator 20 are substantially equal to prevent any transverse movement of the actuator with respect to the support or base. The actuator 20 also has an intermediate portion vertically aligned with the center of the switch and the intermediate portion has a plurality of spaced projections 74 that extend towards the switch. As most clearly shown in FIG. 3, the projections are formed by deforming the resilient metal member 20 to produce longitudinally spaced dimples.

To allow for flexing of the actuator between the supported sides, actuator 20 has a plurality of slits that divide the actuator into a plurality of substantially rectangular flaps 80, which flaps are integrally joined to the remainder of the actuator. More specifically, actuator 20 has first and second slits 82 and 84 located adjacent opposite sides of the actuator and in close proximity thereto. In addition, third and fourth slits 86 and 88 respectively extend from slits 82 and 84 towards the opposite side and terminate at a location slightly spaced from the slit located adjacent the opposite side. An inspection of FIG. 2, shows that slits 82 and 86 cooperate to define a first substantially T-shaped slit while slits 84 and 88 cooperate to define a second substantially T-shaped slit. Each of the T-shaped slits, one of which is inverted in plan view in FIG. 2, has its horizontal portion located adjacent one of the respective sides 70 while the vertical portions extend parallel and in close proximity to each other. The vertical portions of the T-shaped slits terminate at a location slightly spaced from the horizontal portion of the opposite T-shaped slit. This will result in a bridging element 90 that extends substantially the entire transverse dimension of the flaps 80 and is integrally joined at opposite ends to opposite corners of the adjacent flaps 80, as indicated by the reference numeral 92.

The actuator or member 20 also has recesses in the sides 70 at each of the four corners of the polygonal member. The recesses cooperate with the slits to define integral bridging connections or elements 95 between sides 70 and the adjacent corners of flaps 80. In addition, the sides 70 of the actuator have outwardly extending projections 96 that are received in correspondingly shaped recesses 97 that are defined in the upper outer peripheral surface of the base or support 16, more particularly the upper surface of the side wall 26. The projections 96 and recesses 97 define cooperating means between base 16 and actuator 20 to prevent longitudinal movement.

The various elements of the actuating means are assembled in the relation shown in FIG. 3 wherein switch 18 is located within recess 30 in base 16 and is held in a fixed position by having portions located under L-shaped members 32. The respective strips 42 and 44 of switch 18 will have lead wires 100 connected thereto, which extend through openings (not shown) adjacent the central portion of the support or base 16 for connection to suitable terminals located in the steering column.

After switch 18 is secured in base 16, actuator 20 is positioned on the base so that the projections 96 are located in recesses 97 while the sides 70 are supported on ledges 72. An inspection of FIG. 3 reveals that, in the assembled position, the substantially flat planar member 20 that defines the actuator extends parallel to the upper surface of the base while the dimples or projections 74 are longitudinally aligned with the switch and the centers of the projections engage the center of the arcuate or crowned surface 50 on the resilient casing 36.

To complete the assembly, the cover is placed over the actuator and side wall 62 of the cover is deflected outwardly to allow the flange 28 to be inserted into the recess 63. In its final assembled relation, the cover and support or base cooperate to hold opposite sides of the actuator in a fixed position relative to the switch, which is also held in fixed position on the base.

In operation, the application of force to any area of the actuating cover that overlies the actuator and the recess 30 in the base will cause a deflection of the actuator between the supported sides 70 of the actuator. The specific relation and location of the various slits 80–88 will allow the actuator and more specifically the two flaps 80 to be deflected about various hinge points. For example, if a force is applied to the intermediate portion of the cover adjacent either end of the actuator 20, the hinge axis would be along a line running through opposite ends of the sides 70 adjacent the inner end of recesses 94. Also, if a force were applied to the center portion of the left-hand flap 80 as viewed in FIG. 2, directly over the switch 18, the flap 80 would pivot about the outer left-hand integral connections between the flap and the remainder of the actuator to produce contact between the strips 42 and 44. Furthermore, if a force were applied adjacent the lower inner edge of the left-hand flap 80, the hinge axis would be along a line extending diagonally across opposite corners of the left-hand flap 80.

The arrangement is such that the application of force to any portion of the cover that overlies the actuator will produce sufficient flexing or deflection of the actuator to produce engagement between the metal conductive contact strips 42 and 44.

While only one of such actuators has been shown in detail, the preferred embodiment contemplates that each arm 12 would have such an actuator located between the switch 18 and cover 22 adjacent the outer ends of the arms. This would be the position that the hands of a vehicle operator would be occupying during normal operation of the vehicle so that any type of compressive force supplied by the hands would actuate the switch 18. If desired, two separate switches could be located in the respective arms 12 and interconnected adjacent the inner end through lead wires 100 to a conventional horn assembly.

As can be seen, the mechanism of the present invention provides a simple and inexpensive actuator that may be incorporated between the cover and switch in a steering assembly.

What is claimed is:

1. Actuating means for use with a warning device comprising a support; an elongated switch carried by said support, said switch including first and second resilient metal strips with a resilient non-conductive member having an elongated passage receiving said strips and normally maintaining said strips in spaced relation; and an elongated resilient actuator, said actuator having opposite sides engaging said support with an intermediate portion aligned with said switch, said intermediate portion having a plurality of longitudinally spaced projections extending toward said switch, said actuator having at least two substantially T-shaped slits, said T-shaped slits having horizontal portions located adjacent the respective opposite sides of said actuator and vertical portions extending parallel to each other, said slits dividing said actuator into a plurality of flaps, said vertical portions terminating at a location spaced from the horizontal portion of the other T-shaped slit to define an integral bridging element between adjacent pairs of flaps, said flaps being integrally joined along one edge to the remainder of said actuator so that application of a force to any point on said flaps will deflect said flaps relative to the sides of said actuator, and will cause said projections to produce engagement between said metal strips.

2. Actuating means as defined in claim 1, in which there are two flaps that are respectively integrally joined to said actuator adjacent opposite ends thereof.

3. Actuating means as defined in claim 2, in which said support has a ledge adjacent the periphery with said sides supported on said ledge and in which said actuator has recesses in said sides adjacent opposite ends so that the opposite ends are free to move toward said switch.

4. Actuating means as defined in claim 3, in which outer edges of said sides engage a wall of said ledge to prevent transverse movement between actuator and support, and in which said actuator and support have cooperating means for preventing longitudinal movement between said actuator and support.

5. Actuating means as defined in claim 1, further including a cover connected to said base and having a resilient portion overlying said actuator.

6. Actuating means as defined in claim 5, in which said base is attached to a steering mechanism for a vehicle and said warning device is a horn.

7. An electrical switching mechanism comprising a rigid base having an elongated recess; an elongated switch including first and second conductive strips supported in spaced relation in a casing located in said recess and spaced from opposite sides; an actuator extending across said recess above said switch, said actuator being substantially flat and having opposite sides supported on adjacent sides of said base and opposite ends extending across said recess; and a resilient cover engaging said actuator and connected to said base to hold the opposite sides of said actuator in a substantially fixed position on said base, said actuator having projections aligned with and engaging said casing, said actuator having slits defining a pair of polygonal flaps, each having a plurality of edges, said slits being arranged so that one edge of the respective pairs of flaps is integral with an adjacent end of said actuator and the remaining edges are substantially free to move relative to said actuator to allow said flaps to be flexed between said sides to have said projections produce engagement between said strips when pressure is applied to any portion of said cover overlying said actuator.

8. An electrical switching mechanism comprising a base having an elongated recess; an elongated switch including first and second conductive strips supported in spaced relation in a casing located in said recess and spaced from opposite sides; an actuator extending across said recess above said switch, said actuator being substantially flat and having opposite sides supported on said base; and a resilient cover engaging said actuator and connected to said base to hold the opposite sides of said actuator in a substantially fixed position on said base, said actuator having projections aligned with and engaging said casing, said actuator having slits dividing said actuator into two substantially rectangular flaps with a bridging element between adjacent inner edges of said flaps, said bridging element being spaced from the adjacent edges of said flaps and being integrally joined with the respective edges at opposite corners to allow said actuator to be flexed between said sides to have said projections produce engagement between said strips when pressure is applied to any portion of said cover overlying said actuator.

9. An electrical switching mechanism as defined in claim 8, in which said actuator is substantially rectangular and has recesses at each corner with the recesses cooperating with said slits to define integral bridging connections between said sides and adjacent corners.

* * * * *